United States Patent
Blake

(10) Patent No.: US 10,300,582 B2
(45) Date of Patent: May 28, 2019

(54) FASTENER STAGING AND PLACEMENT SYSTEM AND METHOD OF USING THE SAME

(71) Applicant: Dewayne Eugene Blake, Mooresville, IN (US)

(72) Inventor: Dewayne Eugene Blake, Mooresville, IN (US)

(73) Assignee: Invoke 3D, LLC, Mooresville, IN (US)

( * ) Notice: Subject to any disclaimer, the term of this patent is extended or adjusted under 35 U.S.C. 154(b) by 408 days.

(21) Appl. No.: 15/052,795

(22) Filed: Feb. 24, 2016

(65) Prior Publication Data

US 2016/0243685 A1    Aug. 25, 2016

Related U.S. Application Data

(63) Continuation-in-part of application No. 14/487,510, filed on Sep. 16, 2014, now Pat. No. 9,707,667.

(60) Provisional application No. 62/120,645, filed on Feb. 25, 2015, provisional application No. 61/944,817, (Continued)

(51) Int. Cl.
| | |
|---|---|
| *B25B 13/06* | (2006.01) |
| *B25B 23/04* | (2006.01) |
| *B25B 23/10* | (2006.01) |
| *B23Q 3/00* | (2006.01) |
| *B23Q 1/25* | (2006.01) |
| *B23P 19/04* | (2006.01) |
| *B23P 11/00* | (2006.01) |
| *B23Q 1/00* | (2006.01) |

(52) U.S. Cl.
CPC ............ *B25B 13/065* (2013.01); *B25B 23/04* (2013.01); *B25B 23/101* (2013.01); *B23P 11/005* (2013.01); *B23P 19/04* (2013.01); *B23Q 1/00* (2013.01); *B23Q 1/25* (2013.01); *B23Q 3/00* (2013.01); *Y10T 29/49826* (2015.01); *Y10T 29/49948* (2015.01)

(58) Field of Classification Search
CPC ..... B25B 13/065; B25B 23/04; B25B 23/101; B23Q 1/00; B23Q 1/25; B23Q 3/00; B23P 11/005; B23P 19/04; Y10T 29/49948; Y10T 29/49826
See application file for complete search history.

(56) References Cited

U.S. PATENT DOCUMENTS

| | | | | |
|---|---|---|---|---|
| 2,502,025 A | * | 3/1950 | Raup | ........................ B25B 13/44 81/125 |
| 2,805,594 A | * | 9/1957 | Fogel | ...................... B25B 23/108 279/79 |

(Continued)

*Primary Examiner* — Bayan Salone
(74) *Attorney, Agent, or Firm* — Reichel Stohry LLP; Mark C. Reichel; Natalie J. Dean

(57) ABSTRACT

A fastener staging and placement system comprising a staging member capable of temporarily attaching to structures and storing a plurality of ring type fasteners, and a placement member with a means for gripping and removing one or more fasteners to and from the staging member. The staging member comprises a removable and substantially vertically oriented dowel, configured to present a series of ordered sets of fasteners to the placement member, and an attachment means that may be removably attached to various structures. The placement member comprises two or more gripping arms that are configured to flex and exert pressure on at least one fastener thereby securing an ordered set of fasteners.

20 Claims, 14 Drawing Sheets

Related U.S. Application Data filed on Feb. 26, 2014, provisional application No. 61/878,252, filed on Sep. 16, 2013.

(56) References Cited

U.S. PATENT DOCUMENTS

| | | | | |
|---|---|---|---|---|
| 5,640,889 | A * | 6/1997 | Anderson | B25B 23/065 279/82 |
| 6,606,924 | B2 * | 8/2003 | Chandler | B25B 23/10 279/46.1 |
| 6,609,283 | B1 * | 8/2003 | Somerville | B25B 27/023 29/255 |
| 7,216,409 | B1 * | 5/2007 | Chiu | B25B 27/023 29/255 |
| 7,246,540 | B2 * | 7/2007 | Rillera | B25B 9/00 294/100 |
| 8,069,754 | B2 * | 12/2011 | Elgin | B25B 23/10 81/112 |
| 8,079,123 | B2 * | 12/2011 | Lin | B25B 27/02 29/255 |
| 8,893,591 | B2 * | 11/2014 | DePue | H02G 1/00 269/43 |
| 9,707,667 | B2 * | 7/2017 | Blake | B25B 13/065 |
| 2013/0152743 | A1 * | 6/2013 | DePue | H02G 1/00 81/125 |
| 2015/0000104 | A1 * | 1/2015 | DePue | H02G 1/00 29/464 |
| 2015/0074981 | A1 * | 3/2015 | Blake | B25B 13/065 29/525.02 |

\* cited by examiner

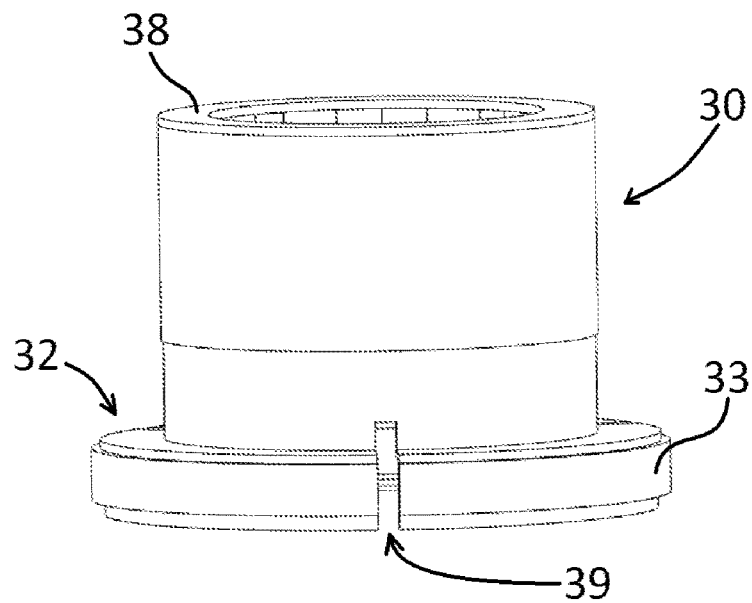
FIG. 11A
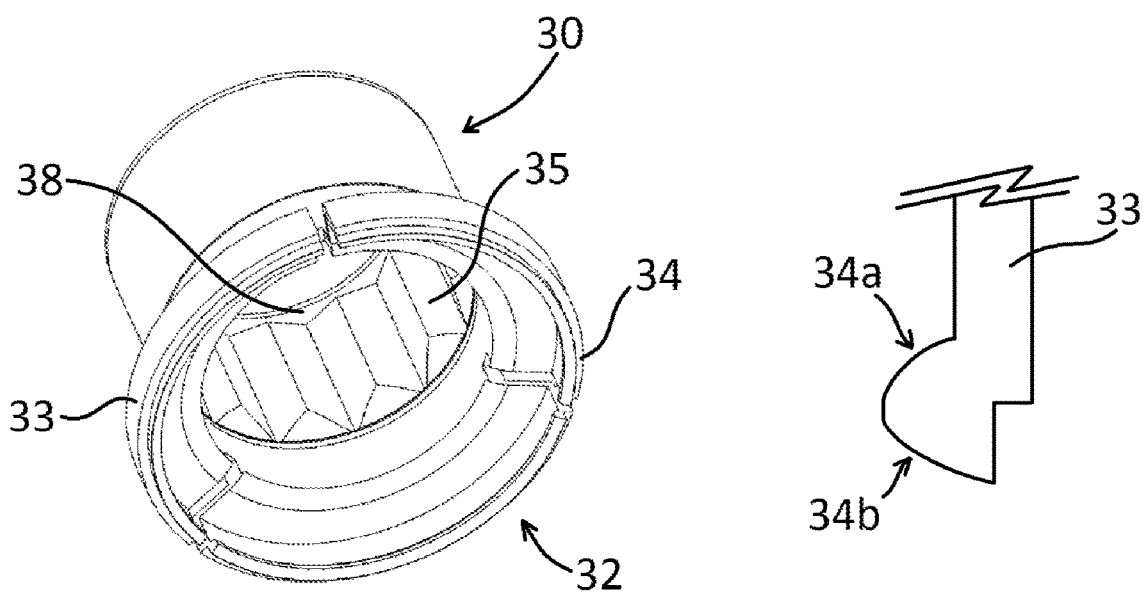
FIG. 11B
FIG. 11C

FASTENER STAGING AND PLACEMENT SYSTEM AND METHOD OF USING THE SAME

PRIORITY

The present application a) is related to, and claims the priority benefit of, U.S. Provisional Patent Application Ser. No. 62/120,645, filed Feb. 25, 2015, and b) is related to, claims the priority benefit of, and is a continuation-in-part patent application of, U.S. Nonprovisional patent application Ser. No. 14/487,510 filed Sep. 16, 2014, which is related to, and claims the priority benefit of, U.S. Provisional Patent Application Ser. No. 61/878,252, filed Sep. 16, 2013, and U.S. Provisional Patent Application Ser. No. 61/944,817, filed Feb. 26, 2014. The contents of each of the foregoing applications are hereby incorporated by reference in their entirety into the present disclosure.

BACKGROUND

Utility linemen are often required to work in elevated workstations such as utility trucks with aerial buckets. These aerial buckets are typically located at the end of an extendable hydraulically driven arm that is attached to a truck or other vehicle and are capable of lifting one or more linemen to elevated positions above the ground.

Once in position, the linemen is often required to perform repairs or assemblies utilizing many tools and small parts such as washers, nuts, and bolts. While performing the repairs and assemblies, the linemen are normally required to wear leather gloves and may sometimes be required to wear thick electrically insulated gloves. These thick gloves make it significantly more difficult to grasp and manipulate small objects.

To solve this problem, there are several related inventions known in the art. For example, hardware storage devices such as bag type apparatuses are configured with one or more grommets capable of receiving hooks that are attached to the lip of the aerial bucket. These bag devices contain a plurality of pockets for storing and organizing tools and fasteners. However, when using gloves linemen can have great difficulty retrieving and manipulating specific items in the pockets of these bag storage devices.

U.S. Pat. No. 5,640,889 filed on Nov. 13, 1995 by Anderson et al. describes a lug nut removal and storage tool comprising a tube with ball bearings that secures lug nuts. While linemen are required to manipulate nut type fasteners and washers, this invention is only able to store and accommodate nut type fasteners.

Typically, linemen are required to attach an ordered set of fasteners onto a bolt. These ordered sets of fasteners usually comprise a nut type fastener and one or more types of washers. The related art contains many inventions that are capable of storing a plurality of fasteners, however, none are able to store and dispense a specific series of sets of different types of fasteners, and are able to then place a specific set of fasteners in a manner that is conducive to manipulation with gloved hands.

Therefore, a need exists for a new fastener staging and placement system capable of storing an ordered plurality of ring type fasteners and capable of placing a set of fasteners in desired locations by gloved hands.

BRIEF SUMMARY

The present disclosure includes disclosure of novel fastener staging and placement systems for use with an elevated workstation, such as an aerial bucket, commonly found on utility trucks. Exemplary fastener staging and placement systems of the present disclosure are capable of storing and placing an ordered plurality of ring type fasteners in a desired location.

A fastener staging and placement system comprising a staging member capable of temporarily attaching to structures and storing a plurality of ring type fasteners, and a placement member with a means for gripping and removing one or more fasteners to and from the staging member. The staging member comprises a removable and substantially vertically oriented dowel, configured to present and a series of ordered sets of fasteners to the placement member, and an attachment means that may be removably attached to various structures such as the rim of aerial buckets. The placement member comprises two or more gripping arms that are configured to flex and exert pressure on at least one fastener thereby securing an ordered set of fasteners. A user with gloved hands is able to use the placement member to pick up an ordered set of fasteners, from the staging member, and to then place and secure the fasteners onto a desired bolt.

In at least one exemplary embodiment of a system of the present disclosure, the system comprises a staging member, comprising a dowel sized and shaped to receive a plurality of fasteners, and an attachment portion (which may be configured to engage an external product or to otherwise be a component or element coupled to the dowel), and a placement member comprising a fastener gripping portion configured to secure at least one of the plurality of fasteners within a central channel defined within the placement member. In another embodiment, the attachment portion comprises a stanchion receiving unit coupled to at least two clip legs, wherein the at least two clip legs are configured to engage the external product. In yet another embodiment, at least one of the at least two clip legs is movable relative to the stanchion receiving unit. In an additional embodiment, at least one of the at least two clip legs is hingedly coupled to the stanchion receiving unit by at least one spring.

In at least one exemplary embodiment of a system of the present disclosure, wherein at least two of the at least two clip legs define a cut-out corresponding to a shape of a portion of the external product. In an additional embodiment, the stanchion receiving unit defines an aperture therein, the aperture sized and shaped to receive at least part of the dowel therethrough. In yet an additional embodiment, the stanchion receiving unit has a plurality of notches defined therein, the plurality of notches corresponding to a plurality of notched sections of the dowel. In another embodiment, when the dowel is positioned within the aperture so that the plurality of notched sections contacts the plurality of notches, rotation of the dowel in a first direction relative to the stanchion receiving unit causes the dowel to engage the stanchion receiving unit, and rotation of the dowel in a second direction opposite the first direction relative to the stanchion receiving unit causes the dowel to disengage the stanchion receiving unit.

In at least one exemplary embodiment of a system of the present disclosure, the dowel comprises a fastener seat sized and shaped to prevent at least one of the plurality of fasteners from moving beyond the fastener seat after placement upon the dowel from an end of the dowel. In another embodiment, the attachment portion comprises at least one protrusion extending therefrom, the at least one protrusion configured to limit rotation of the attachment portion relative to the external product. In yet another embodiment, staging unit further comprises a ridge, the ridge sized and shaped to be received within the fastener gripping portion of the placement member. In an additional embodiment, the staging member comprises a curved section having two curved portions so that the dowel and the attachment portion are parallel to one another.

In at least one exemplary embodiment of a system of the present disclosure, the fastener gripping portion comprises a plurality of arms configured to surround at least part of the staging member. In an additional embodiment, at least one of the plurality of arms comprises a tapered lip, the tapered lip configured to engage a portion of the staging member. In yet an additional embodiment, the fastener gripping portion comprises an angled interior side, the angled interior side configured to engage at least one of the plurality of fasteners therein.

In at least one exemplary embodiment of a device of the present disclosure, the device comprises a staging member, comprising a dowel sized and shaped to receive a plurality of fasteners, and an attachment portion configured to engage an external product, wherein the staging member is configured to receive a placement member comprising a fastener gripping portion configured to secure at least one of the plurality of fasteners within a central channel defined within the placement member. In an additional embodiment, when the plurality of fasteners is positioned upon the dowel and wherein the placement member is secured upon the staging member, subsequent removal of the placement member results in the plurality of fasteners to be secured within the placement member.

In at least one exemplary embodiment of a method of the present disclosure, the method comprises the steps of positioning a plurality of fasteners upon a dowel of a staging member, the staging member further comprising an attachment portion configured to engage an external product, and positioning a placement member upon the staging member to secure at least one of the plurality of fasteners within a central channel defined within the placement member. In another embodiment, the method further comprises the step of removing the placement member from the staging member, wherein the plurality of fasteners remains secured within the placement member. In yet another embodiment, the method further comprises the steps of positioning the placement member upon a threaded portion of a bolt, rotating the placement member so to position at least one of the plurality of fasteners upon the threaded portion of the bolt, and removing the placement member from the bolt, wherein the plurality of fasteners are no longer positioned within the placement member.

In at least one exemplary embodiment of a system of the present disclosure, the system comprises a staging member, comprising a dowel sized and shaped to receive a plurality of fasteners and an attachment portion configured to engage an external product, and a placement member comprising a fastener gripping portion configured to secure at least one of the plurality of fasteners within a central channel defined within the placement member, wherein the fastener gripping portion comprises a plurality of arms configured to surround at least part of the staging member. In at least one exemplary embodiment of a system of the present disclosure, the placement member further comprises a planar distal end. In at least one exemplary embodiment of a system of the present disclosure, the planar distal end does not have an aperture defined therethrough. In at least one exemplary embodiment of a system of the present disclosure, the planar distal end has an aperture defined therethrough. In at least one exemplary embodiment of a system of the present disclosure, the aperture is a pilot hole at least partially surrounded by a pilot notch, whereby the pilot notch has a larger diameter than a diameter of the pilot hole.

In at least one exemplary embodiment of a system of the present disclosure, the planar distal end has a geometric notch defined therein but not completely through the planar distal end. In at least one exemplary embodiment of a system of the present disclosure, the geometric notch has a square shape. In at least one exemplary embodiment of a system of the present disclosure, the aperture is sized and shaped to receive a socket therethrough, the socket having a drive aperture defined within an end of the socket. In at least one exemplary embodiment of a system of the present disclosure, the system is configured so that when the socket is positioned into the aperture and into the central channel of the placement member upon the plurality of fasteners, the socket can be used to tighten the plurality of fasteners upon a substrate. In at least one exemplary embodiment of a system of the present disclosure, the system is configured so that the placement member can disengage from the plurality of fasteners and slide toward the drive aperture of the socket.

In at least one exemplary embodiment of a placement member of the present disclosure, the placement member comprises a fastener gripping portion configured to secure at least one of a plurality of fasteners within a central channel defined within the placement member, wherein the fastener gripping portion comprises a plurality of arms configured to surround at least part of a staging member having the plurality of fasteners positioned thereon. In at least one exemplary embodiment of a placement member of the present disclosure, the placement member further comprises a planar distal end having an aperture defined therethrough.

In at least one exemplary embodiment of a placement member of the present disclosure, the placement member further comprises a planar distal end that does not have an aperture defined therethrough. In at least one exemplary embodiment of a placement member of the present disclosure, the aperture is a pilot hole at least partially surrounded by a pilot notch, whereby the pilot notch has a larger diameter than a diameter of the pilot hole. In at least one exemplary embodiment of a placement member of the present disclosure, the planar distal end has a geometric notch defined therein but not completely through the planar distal end. In at least one exemplary embodiment of a placement member of the present disclosure, the aperture is sized and shaped to receive a socket therethrough, the socket having a drive aperture defined within an end of the socket. In at least one exemplary embodiment of a placement member of the present disclosure, the placement member is configured so that when the socket is positioned into the aperture and into the central channel of the placement member upon the plurality of fasteners, the socket can be used to tighten the plurality of fasteners upon a substrate and so that the placement member can disengage from the plurality of fasteners and slide toward the drive aperture of the socket.

In at least one exemplary embodiment of a method of the present disclosure, the method comprises the steps of positioning a plurality of fasteners upon a dowel of a staging member, the staging member further comprising an attachment portion configured to engage an external product, and positioning a placement member having a fastener gripping portion upon the staging member to secure at least one of the plurality of fasteners within a central channel defined within the placement member, wherein the fastener gripping portion comprises a plurality of arms configured to surround at least part of the staging member having the plurality of fasteners positioned thereon. In at least one exemplary embodiment of a method of the present disclosure, the method further comprises the step of removing the placement member from the staging member, wherein the plurality of fasteners remains secured within the placement member. In at least one exemplary embodiment of a method of the present disclosure, the method further comprises the steps of positioning the placement member upon a threaded portion of a bolt, inserting a socket into an aperture defined within the placement member so that at least a portion of the socket enters the central channel and engages at least one of the plurality of fasteners, rotating the socket so to position at least one of the plurality of fasteners upon the threaded portion of the bolt, and removing the placement member from the bolt, wherein the plurality of fasteners are no longer positioned within the placement member.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings. Some embodiments of the present disclosure are illustrated as an example and are not limited by the figures of the accompanying drawings, in which like references may indicate similar members and in which:

FIGS. 10A, 10B, 11A, and 11B show various views of a placement member according to various embodiments described herein.

FIG. 11C shows a cross-sectional view of a portion of an arm of a placement member according to various embodiments described herein.

Figure 1:
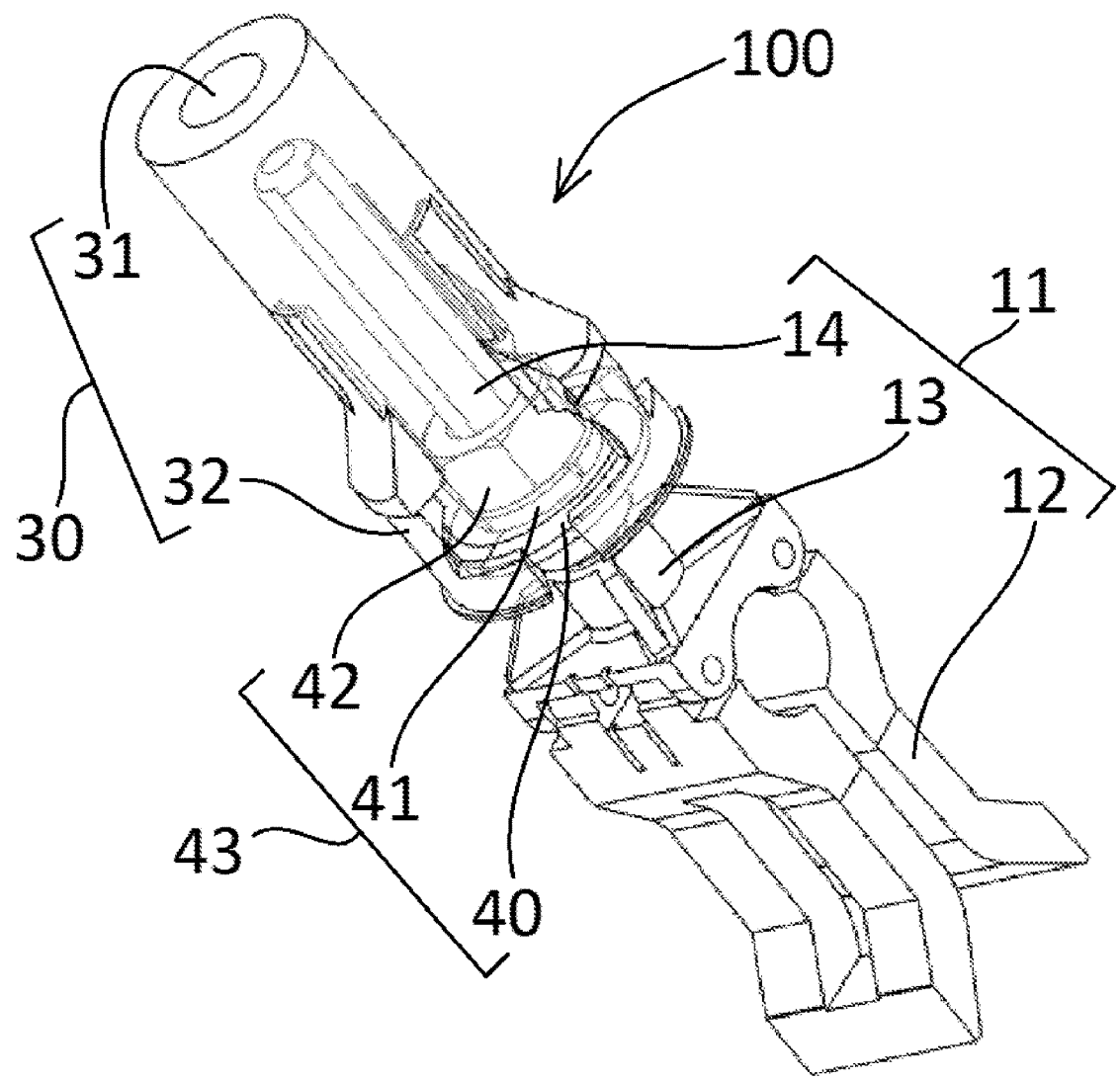
FIG. 1 depicts a transparent perspective view of an example of a fastener staging and placement system according to various embodiments of the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The terminology used herein is for the purpose of describing particular embodiments only and is not intended to be limiting of the present disclosure. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which the present disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing embodiments of the present disclosure, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the specification, figures, and the claims.

New fastener staging and installation systems for use with gloved or non-gloved hands are discussed. In the following description, for purposes of explanation, numerous specific details are set forth in order to provide a thorough understanding of the present disclosure. It will be evident, however, to one skilled in the art that the present disclosure may be practiced without these specific details.

The present disclosure is to be considered as an exemplification of the invention, and is not intended to limit the invention to the specific embodiments illustrated by the figures or description below.

Embodiments of the present disclosure will now be described by referencing the appended figures representing preferred embodiments. FIG. 1 depicts an example of a semi-transparent view of a fastener staging and placement system 100 according to an embodiment of the present disclosure. In this example, the fastener staging and placement system 100 comprises a staging member 11 and a placement member 30 configured to accept ring type fasteners such as locking washers, fender washers, Belleville washers, and/or nut fasteners commonly used with bolt fasteners. In various embodiments, the fastener staging and placement system 100 is configured for use with 0.5 inch fasteners such as one and 1.25 inch outer diameter Belleville or flat washers, 0.86 inch outer diameter lock washers, and/or 0.75 inch outer diameter nuts. In other embodiments, fastener staging and placement system 100 is configured for use with any size Metric or SAE fastener system used by linemen and industrial workers. One skilled in the art will immediately recognize that larger fasteners will require a larger sized fastener staging and placement system 100, while smaller fasteners will require a smaller sized fastener staging and placement system 100.

In an exemplary embodiment, the staging member 11 comprises an attachment means 12 (also referred to as attachment portion 12), a stanchion receiving unit 13, and a dowel 14. In at least one embodiment, and as shown in FIG. 1, a placement member 30 comprises a central channel 31 and a fastener gripping means/portion 32 (also referred to as a fastener gripping portion 32). In such an embodiment, a Belleville washer 40, lock washer 41, and a nut 42 (exemplary fasteners 43 of the present disclosure as shown in FIG. 1) can be stored on the dowel 14 of the staging member 11. The placement member 30 can be placed over and down onto the dowel 14, so that the dowel 14 enters the central channel 31, until the fastener gripping means/portion 32 physically engages the Belleville washer 40, for example. Once the fastener gripping means/portion 32 engages the Belleville washer 40, removal of the placement member 30 from the staging member 11 will effectuate the removal of all three of the fasteners (40, 41, and 42, for example) from the staging member 11. The placement member 30 is then placed over and down onto a desired bolt (not shown), so that the bolt enters the central channel 31, and is rotated, in at least one example, until the threads of the nut 42 engage the threads of the bolt. Once the nut 42 is threaded onto the bolt, the placement member 30 is pulled off the bolt which in turn disengages the Belleville washer 40 from the fastener gripping means/portion 32 leaving the fasteners on the bolt.

Figure 2:
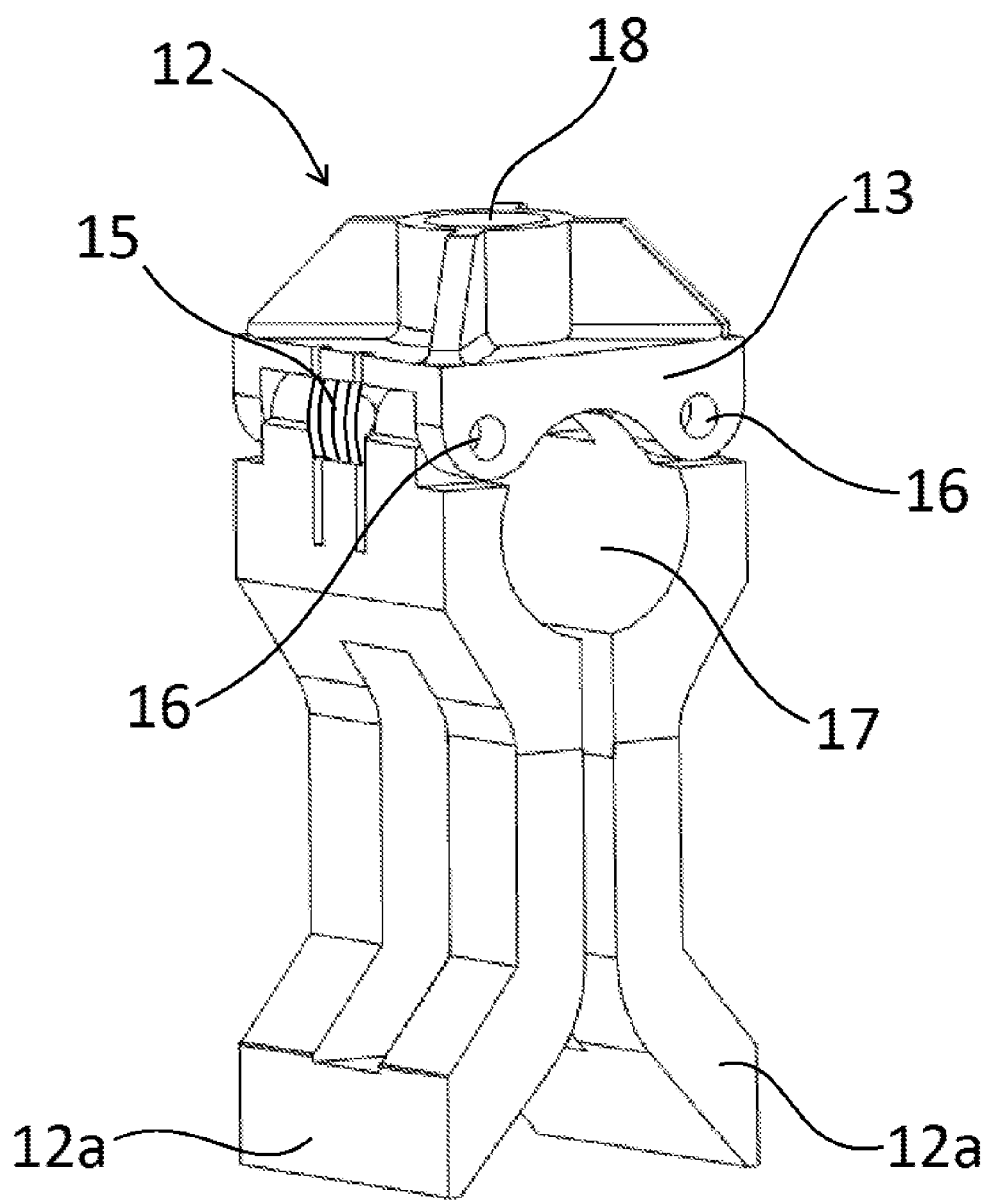
FIG. 2 illustrates an example of a side perspective view of a lower assembly of a staging member according to various embodiments described herein.
Figure 4:
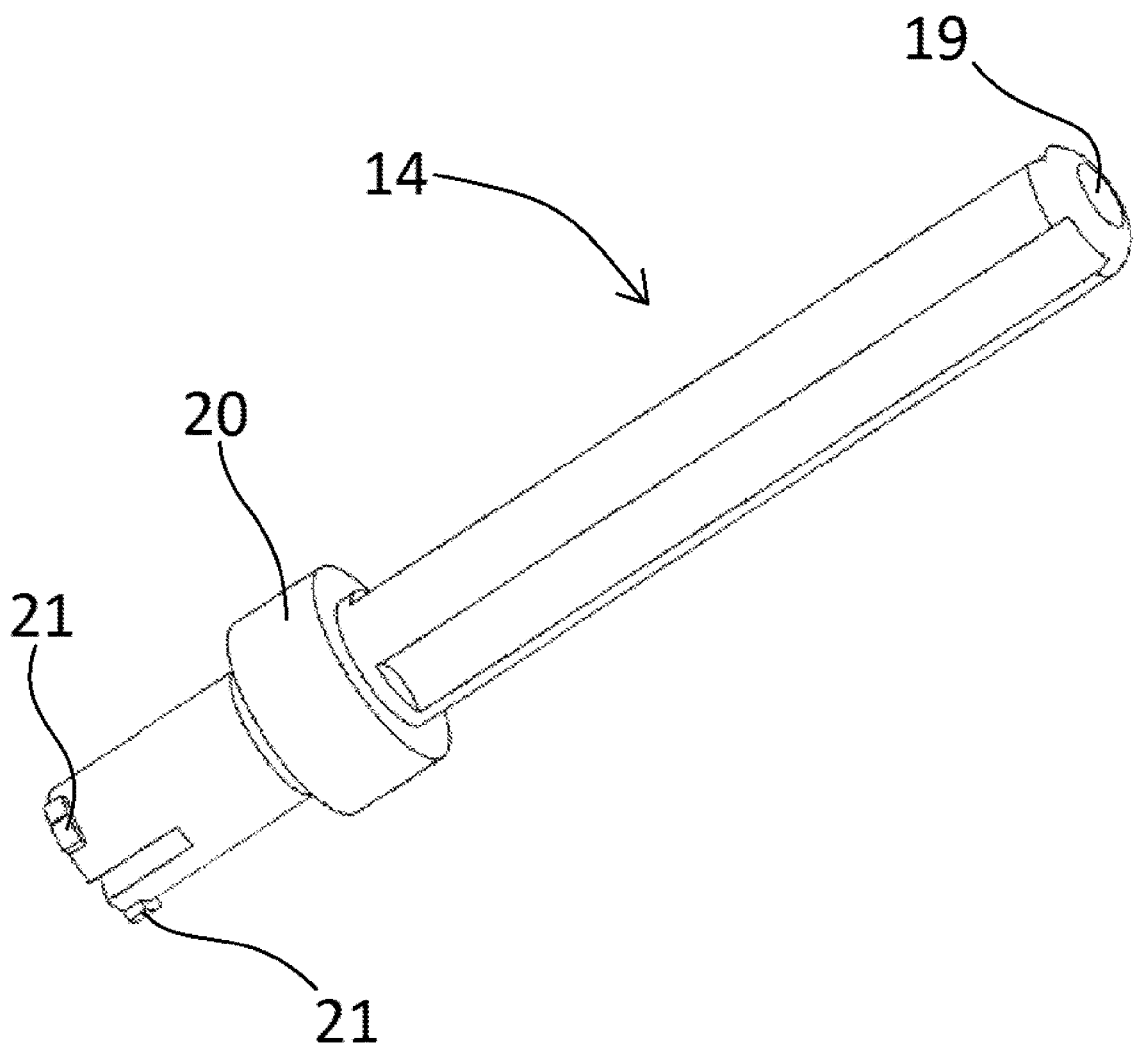
FIG. 4 depicts an example of a side view of a dowel configured to be removably connected to a staging member according to various embodiments described herein.

An exemplary side perspective view of a lower assembly of a staging member 11 according to some embodiments of the present disclosure is illustrated in FIG. 2. In this example, the attachment means/portion 12 comprises two movable clip legs 12a which are configured to resist the movement of the clip legs 12a away from each other by the action of one or more torsion springs 15, leaf springs, compression springs, and the like. The clip legs 12a and torsion springs 15 are attached to the stanchion receiving unit 13 at the two hinge points 16. In some embodiments, the stanchion receiving unit 13 defines an aperture 18 therein or therethrough configured to receive the base of a removable dowel 14, as shown in FIGS. 1 and 4. In some embodiments, the stanchion receiving unit 13 and the two clip legs 12a are each configured with a cut out 17 configured to accept the lip of aerial bags typically used on aerial bucket trucks and the like. In other embodiments, the attachment means/portion 12 may comprise one movable clip leg 12a and one clip leg 12a that is not configured to move.

Figure 3:
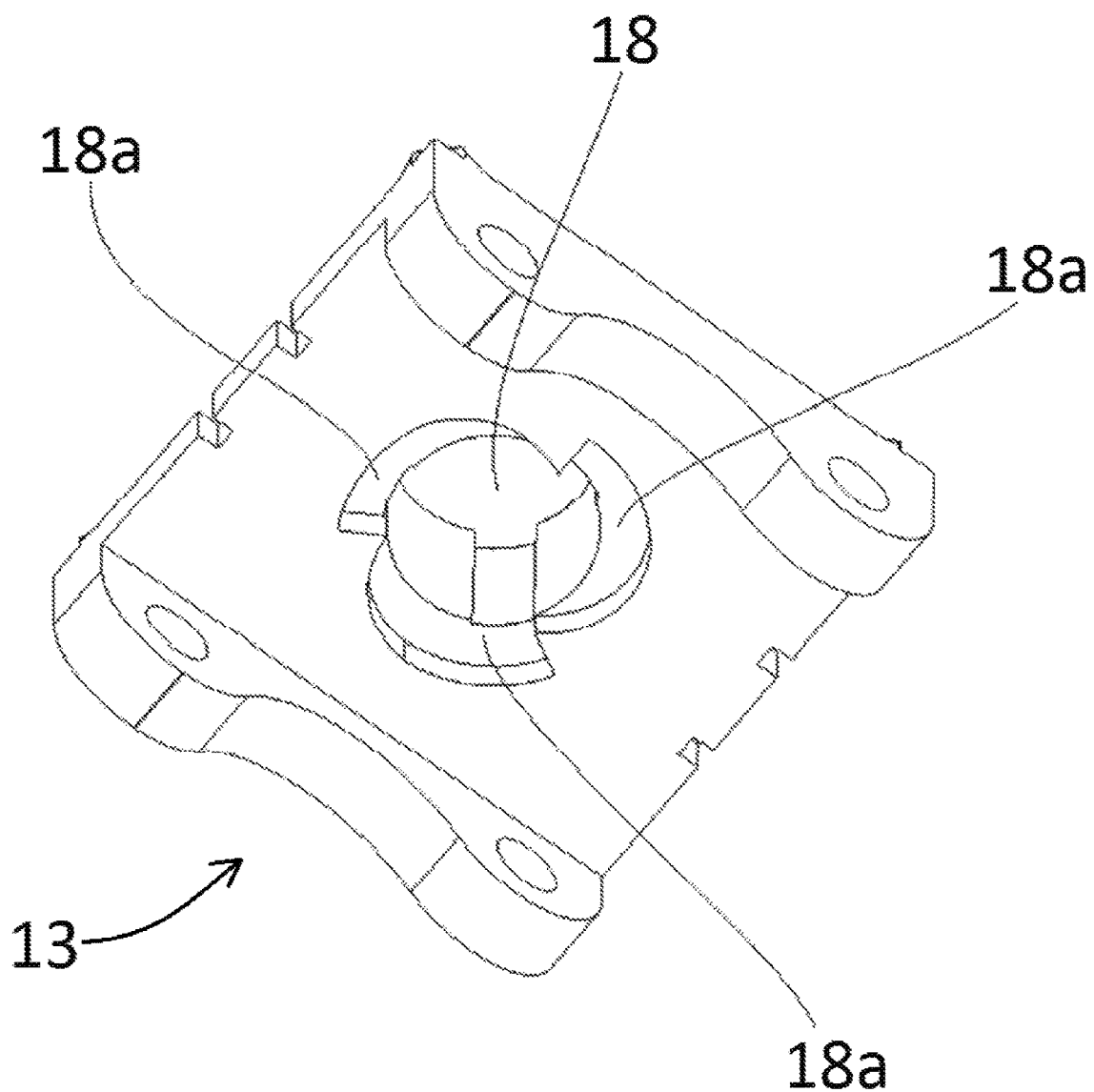
FIG. 3 shows an example of a bottom view of a stanchion receiving station of a staging member according to various embodiments described herein.

FIG. 3 shows an example of a bottom of a stanchion receiving unit 13 of a staging member 11 according to an embodiment of the present disclosure. The aperture 18 is configured to receive and support the base of a dowel 14 and may be configured to maintain the dowel 14 in a vertical orientation. In some embodiments, the aperture 18 is configured to receive and support the base of the dowel 14 to maintain the dowel 14 in a substantially vertical orientation of or about 13 degrees off of vertical. In other embodiments, the aperture 18 is configured to receive and support the base of the dowel 14 to maintain the dowel 14 in a substantially vertical orientation of or between 1 and 25 degrees off of vertical. The aperture 18 may be surrounded by one or more (in this example three) female grooved notches 18a defined within the stanchion receiving unit 13 which are configured to accept the base of the dowel 14 such as depicted in FIG. 4. In other embodiments, the dowel 14 is not removable from the aperture 18 of the stanchion receiving unit 13, and is either molded as one piece or formed as separate pieces that are coupled to one another.

An example of a side view of a dowel 14 which may be removably or permanently connected to a staging member 11 is depicted in FIG. 4. The dowel 14 may have a substantially blunt pointed end 19 capable of accepting hardware such as nuts and washers. A fastener seat 20 allows for fasteners (such as fasteners 40, 41, and 42, for example) residing on the dowel 14 to be positioned slightly above the stanchion receiving unit 13, allowing the gripping means/portion 32 of the placement member 30 to extend over and secure the fastener closest to the stanchion receiving unit 13. In the example shown, the dowel 14 terminates into three notched sections 21 which when inserted and twisted into the aperture 18 depicted in FIG. 3, compress and lock into the three female grooved notches 18a that surround the aperture 18. Twisting the dowel 14 in the reverse direction and pulling disengages and decompresses the notched sections 21 from the female grooved notches 18a allowing removal of the dowel 14 from the aperture 18 in such an example.

The dowel 14 may be of a diameter capable of accepting a wide size range of hardware common in the art. In some embodiments, the dowel 14 may be at or about 0.42 inches in diameter. In other embodiments, the dowel 14 diameter may be between 0.25 inches and 3 inches. In some embodiments, the dowel 14 is about 3.5 inches in length. In other embodiments, the dowel 14 is at or between 3 inches and 8 inches in length. In further embodiments the dowel 14 is at or between 2 inches and 12 inches or any suitable length or diameter to accommodate various sizes and numbers of fasteners.

Although a specific example is provided for a dowel 14 within FIG. 4, other shapes and sizes of dowels or vertical rods are contemplated herein which may be permanently or removably attached to the stanchion receiving unit 13 in accordance with various embodiments of the present disclosure.

Figure 5:
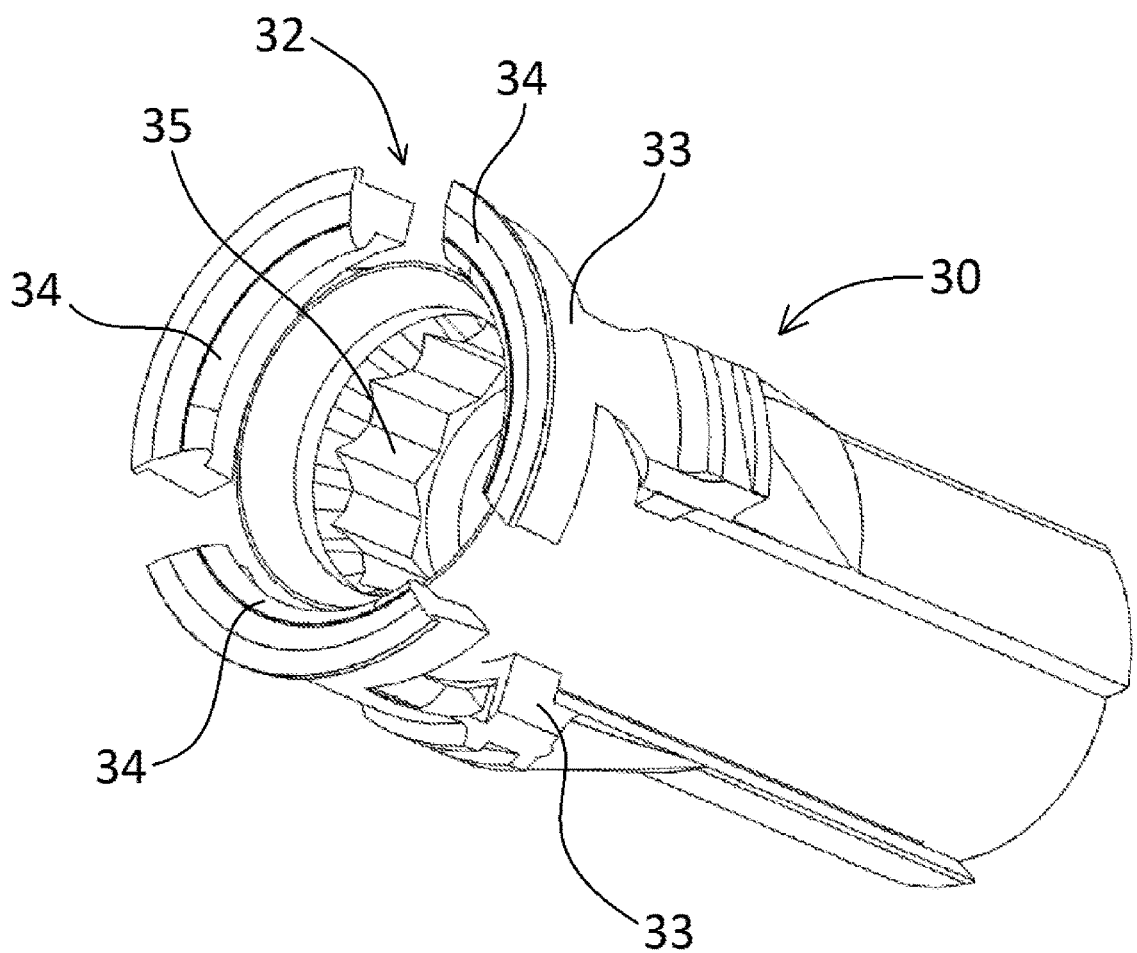
FIG. 5 illustrates an example of a substantially side view of the bottom of a placement member according to various embodiments described herein.

FIG. 5 depicts an example of a substantially side perspective view of the bottom of a placement member 30 according to an embodiment of the present disclosure. In this preferred embodiment, placement member 30 is substantially cylindrical in shape with a gripping means/portion 32 (that may comprise two, three, or more arms 33, each configured with a lip 34 which may be tapered as shown within the figures.

In other embodiments, the griping means/portion 32 comprises two or more arms 33. The arms 33, in various embodiments, are flexibly attached to the placement member 30 so that as the placement member 30 is pushed down onto a fastener such as a washer or nut, the fastener presses on the tapered lips 34 causing the arms 33 to flex outward allowing the fastener to enter the central channel 31. Once the fastener has passed the tapered lips 34, the tapered lips return to their original position and prevent the fastener from falling out of the placement means/portion 30. The portion of the central channel 31 closest to the arms 33 may preferably have a plurality of angled interior sides 35, and may be shaped and sized to accommodate a specific size of nut 42, for example. Thus, the central channel 31 comprises a portion that may be pentagonal, hexagonal, or octagonal, having five, six, or eight interior sides 35 respectively, and be configured for use with any size SAE or Metric nut type fastener or other similar objects.

Figure 6:
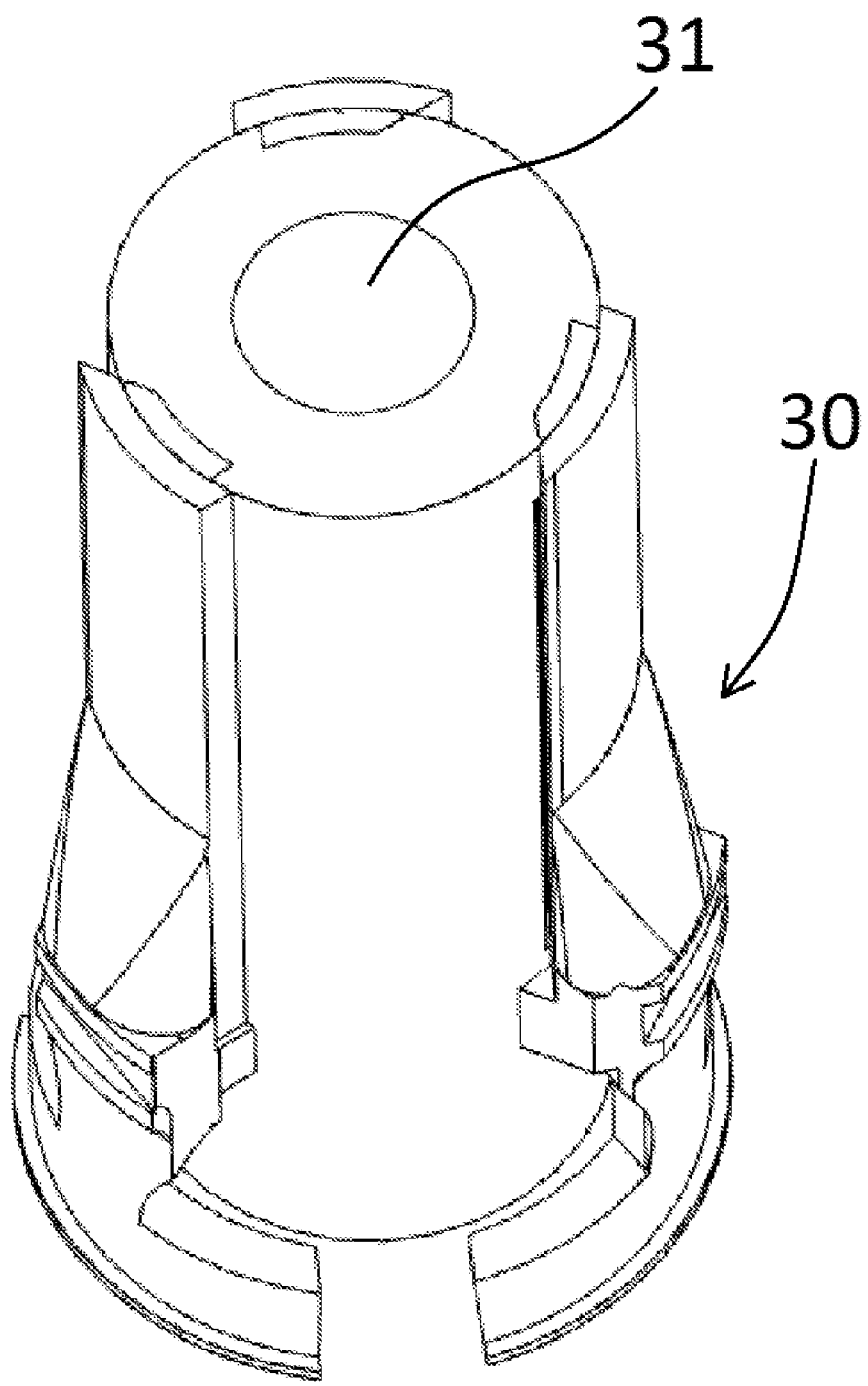
FIG. 6 shows an example of a substantially side view of the top of a placement member according to various embodiments described herein.

In the embodiment shown in FIG. 6, the central channel 31 may extend the length of the placement member 30 to allow a longer dowel 14 or bolt to pass through to top of placement member 30. In some embodiments, the top of the central channel 31 is substantially circular in diameter. In other embodiments, the top of the central channel 31 may be substantially square in shape and a dimension configured to accommodate ratchets and other fastener tightening tools, such as shown in the placement member embodiment 30 shown in FIG. 9. As shown therein, the top of central channel 31 has a square shape, so to be engaged by a square drive tool, for example. Such an embodiment, for example, can be used on a ratchet as a starting fastener, but may or may not be intended for final torque.

Figure 7:
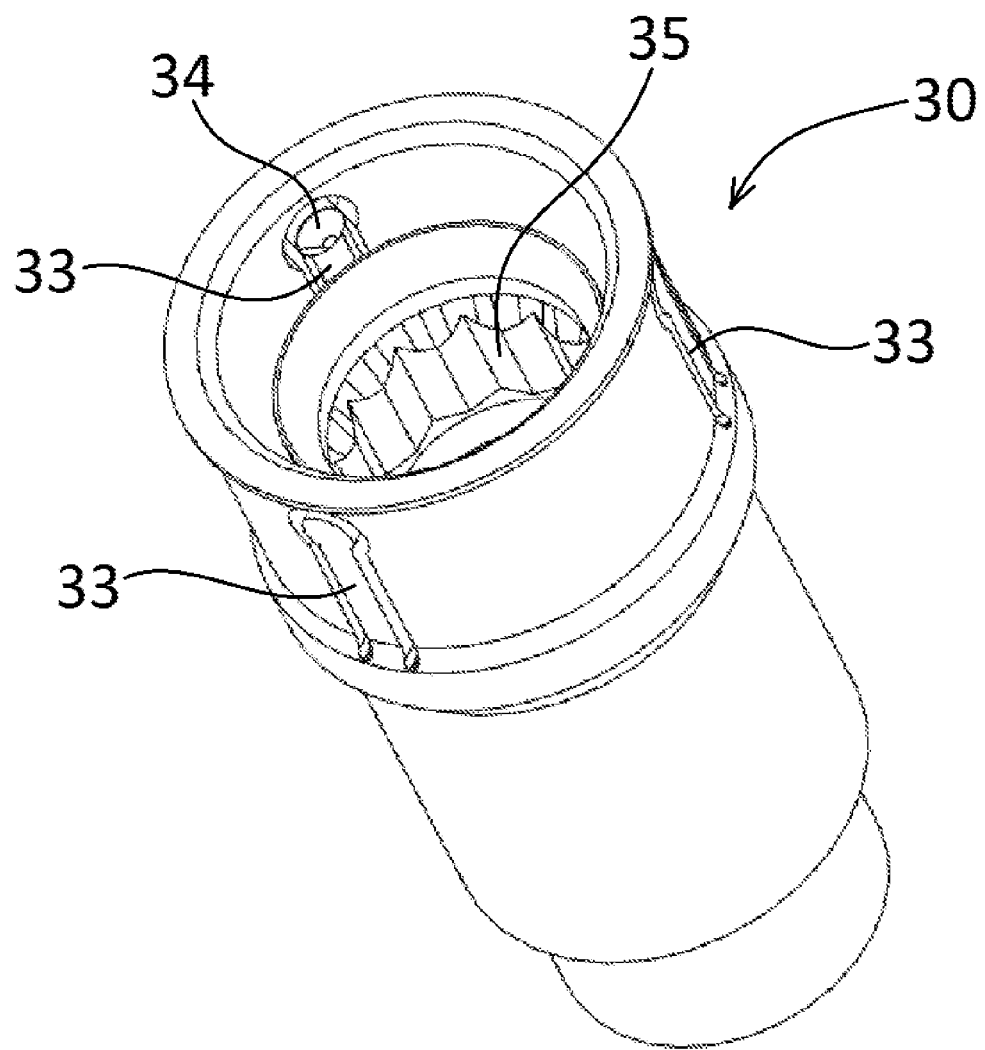
FIG. 7 depicts an example of a substantially side view of the bottom of a placement member according to various embodiments described herein.

FIG. 7 depicts an example of another embodiment of a placement member 30 of the present disclosure. In this embodiment, the gripping means/portion 32 comprises three arms 33 that are substantially recessed into the body of the placement member 30. In other embodiments, the griping means/portion 32 comprises two or more arms 33. The tapered lips 34 of the arms 33 may be circular and convex in shape, but are still configured to cause the arms 33 to flex outward as the placement member 30 is pressed over one or more fasteners. Once the final fastener has passed the tapered lips 34, the tapered lips 34 return to their original position, and prevent the fasteners from falling out of the placement member 30. The portion of the central channel 31 closest to the arms 33 may have a plurality of interior angled sides 35, and is shaped and sized to accommodate a specific size of nut 42. Thus, the central channel 31 comprises a portion that may be pentagonal, hexagonal, or octagonal, having five, six, or eight interior sides 35 and may be configured for use with any size SAE or Metric nut type fastener.

Figure 8:
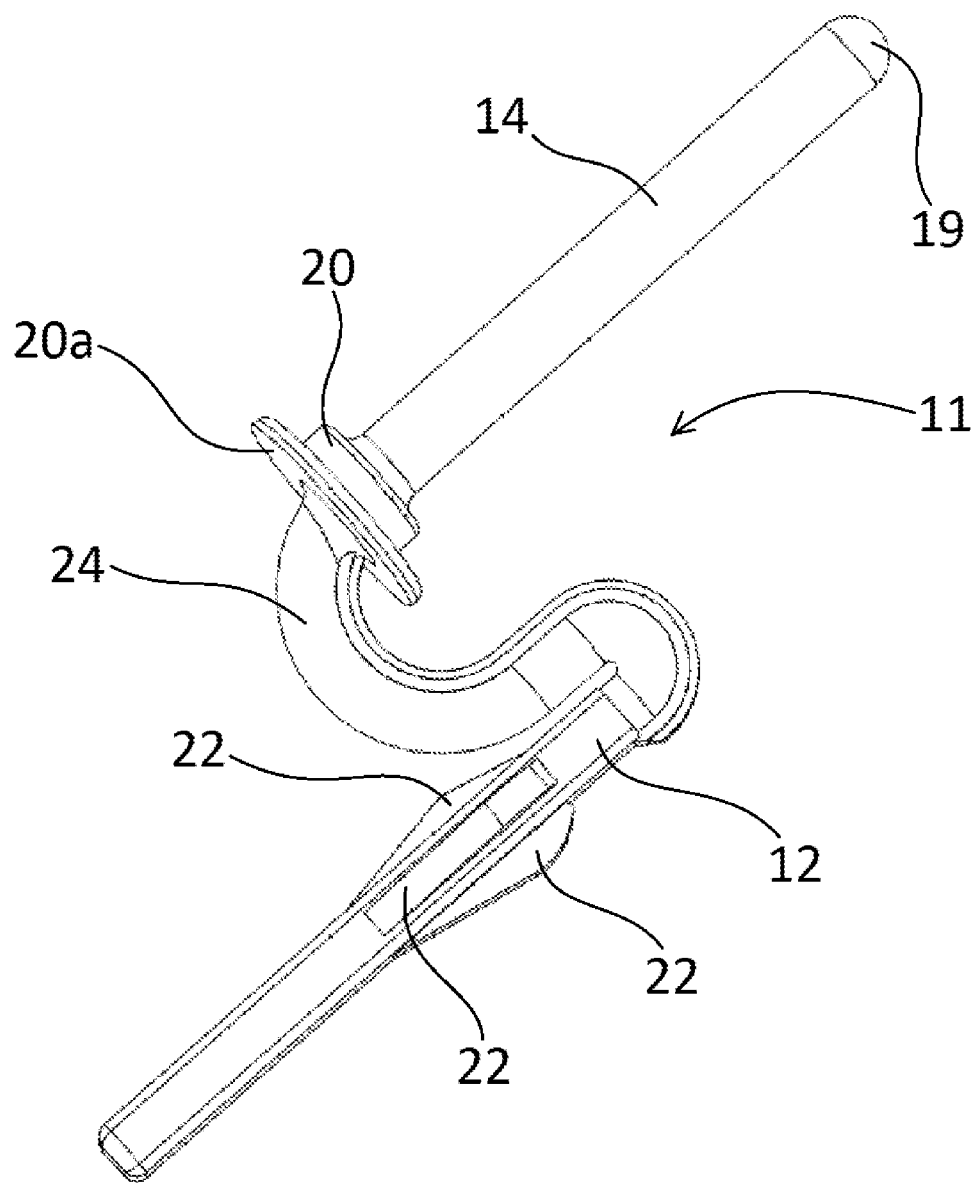
FIG. 8 illustrates an example of a side profile view of a staging member according to various embodiments described herein.

Turning now to FIG. 8, another embodiment of a staging member 11 is illustrated. In this embodiment, the staging member 11 comprises a dowel 14 attached to a fastener seat 20. The dowel 14, in at least one embodiment, comprises a pointed end 19 configured to accept ring type fasteners and tools comprising a central orifice. As depicted in this embodiment, the attachment means/portion 12 is joined to the fastener seat 20 and dowel 14, and further may comprise one or more protrusions 22 configured to secure and position the staging member 11 when the attachment means/portion 12 is inserted into a pocket in a tool pouch, aerial bucket nose bag, tool apron, hand tool bag, and the like (each referred to herein as an "external product"). In this and other embodiments, the fastener seat 20 may comprise a ridge 20a which may be configured to secure to one or more tapered lips 34 of a placement member 30. In some embodiments and as shown by example in FIG. 8, the staging member may contain a curved section 24 between dowel 14 and attachment means/portion 12, so to, for example, secure attachment means/portion 12 to a pocket or other item.

Figure 10A:
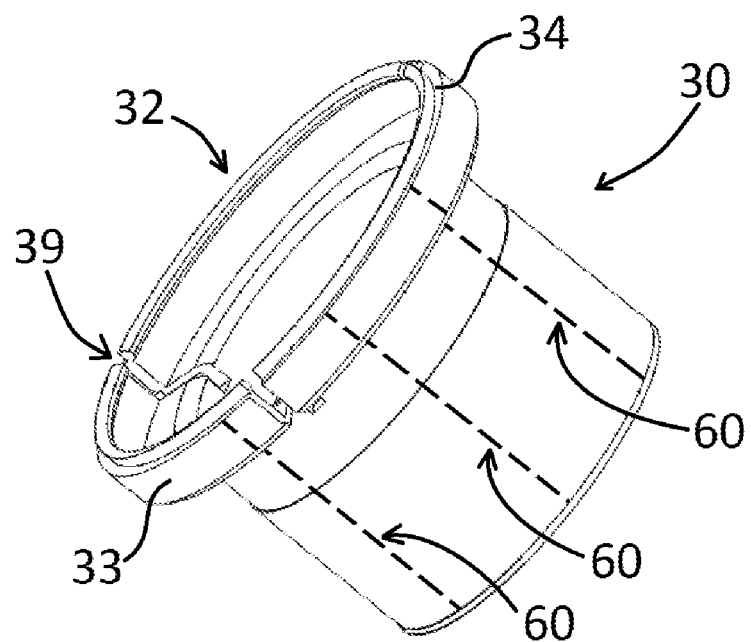

FIGS. 10A-11B show various views of an additional exemplary placement member 30 of the present disclosure. FIG. 10A shows a side perspective view, FIG. 10B shows a top perspective view, FIG. 11A shows generally a side view, and FIG. 11B shows a bottom perspective view, of an exemplary placement member 30 having an inner lip 38 at an end generally opposite to that having fastener gripping means/portion 32. Inner lip 38, as shown in FIGS. 10B-11B, is configured to protrude inward into a central channel 31 of placement member 30, so to act as a "stop" for an exemplary fastener 43, such as nut 42, so to prevent nut 42 from extending through the opening defined by inner lip 38.

In the embodiments shown in FIGS. 10A-11B, and in various other embodiments of the present disclosure, fastener gripping means/portion 32 may be substantially circular and have one, two, three, or more cutout recesses 39 defined therein, so to facilitate flex of fastener gripping means/portion 32, as generally described herein, when using placement member 30 to engage various fasteners 43 therein. Furthermore, and as shown in FIGS. 10A and 11B, tapered lips 34 may be tapered on a relative inside (indicated as 34a on FIG. 11C, which shows a cross-section of a portion of an arm 33 of a placement member 30 as shown in FIG. 11B) as well as a relative outside (as indicated as 34b in FIG. 11C), or may be tapered on a relative inside (only element 34a) or a relative outside (only element 34b), of placement member 30, as desired.

Figure 9:
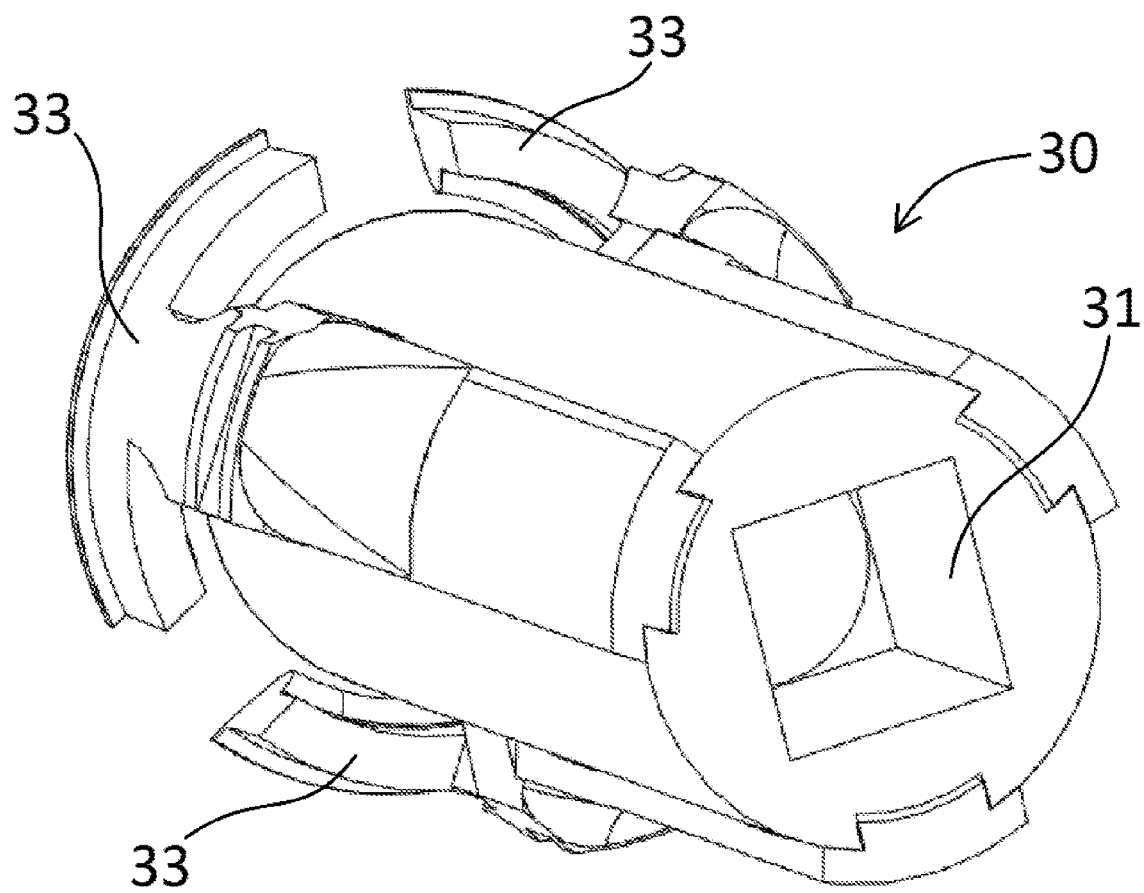
FIG. 9 shows an example of a substantially side view of the top of a placement member according to various embodiments described herein.
Figure 10B:
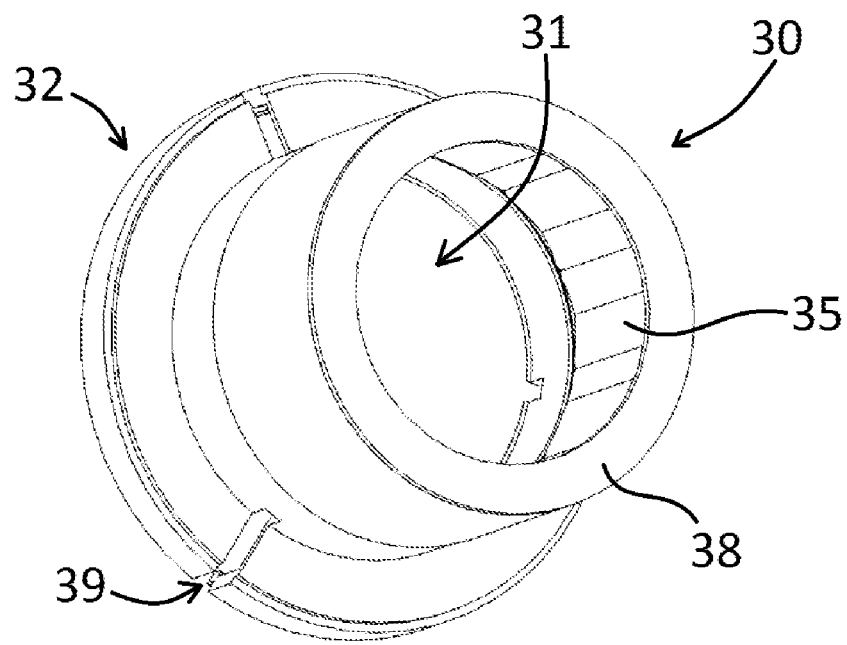
Figure 11D:
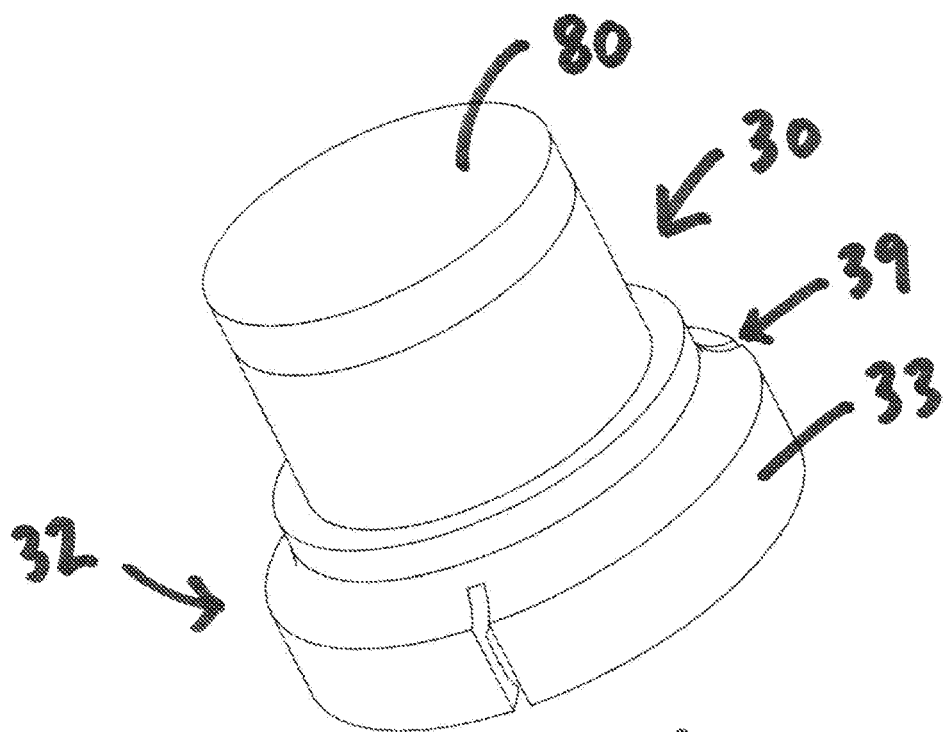
FIGS. 11D, 11E, and 11F show perspective views of staging members, according to various embodiments described herein.

FIG. 11D shows an additional embodiment of an exemplary placement member 30 of the present disclosure. As shown in FIG. 11D, placement member 30, instead of having an inner lip 38 defining an aperture 50 therethrough (as shown in FIG. 10B), has a planar end 80 with no aperture 50 defined therethrough. Such a placement member 30 embodiment would cause a bolt to "push" off of placement member 30 from the pre-staged set of fasteners 43 (such as a Belleville washer 40, lock washer 41, and nut 42, for example). This provides an option to pre-load placement member 30 with fasteners 43 by hand or machine without using a staging member 11, such as shown in FIG. 8, prior to using said fasteners 43, and/or the process can be performed using gloved hands, for example. Furthermore, and in placement member 30 embodiments of the present disclosure configured for use with a square drive tool, such as shown in FIG. 9, it would work well as desired and not have a tendency to pull off of said tool (an extension, ratchet, and/or the like).

Figure 11E:
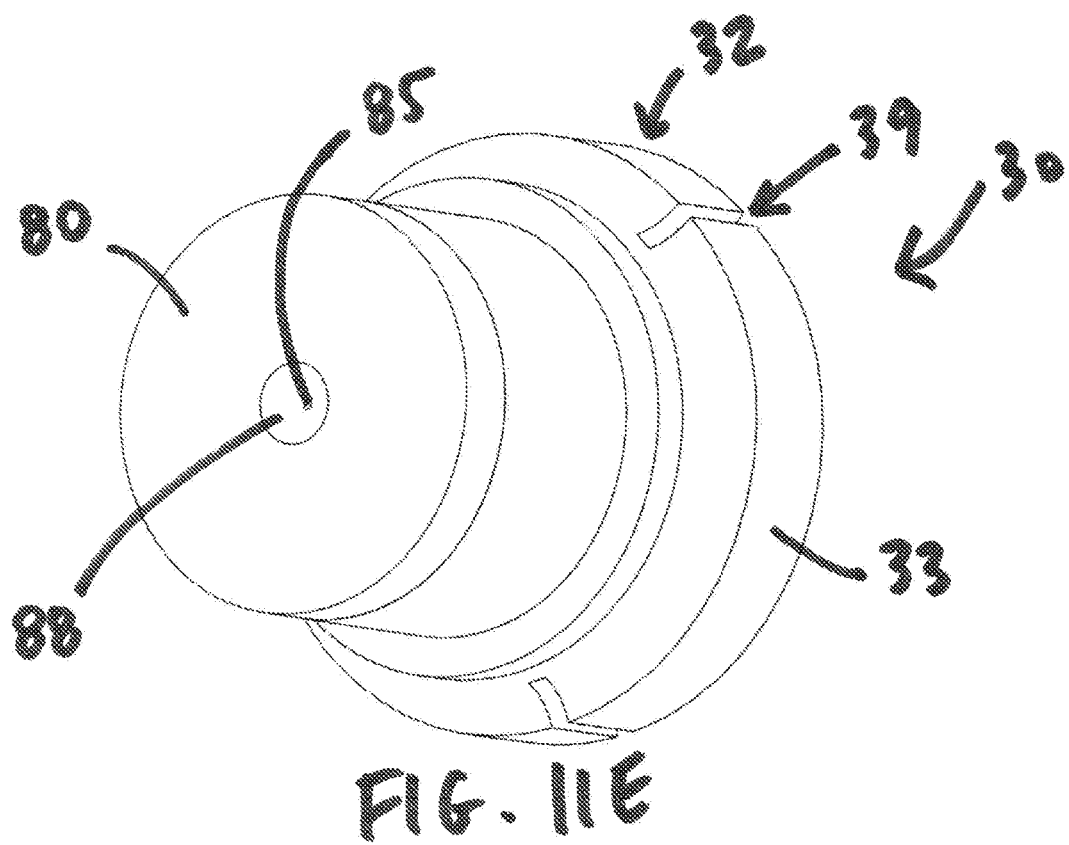

FIG. 11E shows a placement member 30 similar to that shown in FIG. 11D, but having a planar end 80 with a pilot hole 85 defined therethrough. Such a pilot hole 85 may be defined within planar end 80 with a pilot notch 88, whereby, for example, pilot hole 85 is defined within planar end using part of a device (drill bit, wire, rod, etc.) sized and shaped to form pilot hole 85 during or after production of placement member 30, and whereby pilot notch 88 is defined using the same or a different device, whereby a relative diameter of pilot notch 88 is larger than a relative diameter of pilot hole 85. Pilot hole 85 and/or pilot notch 88 can serve as a guide for a user to drill out more of planar end 80 after manufacture of placement member 30, as desired.

Figure 11F:
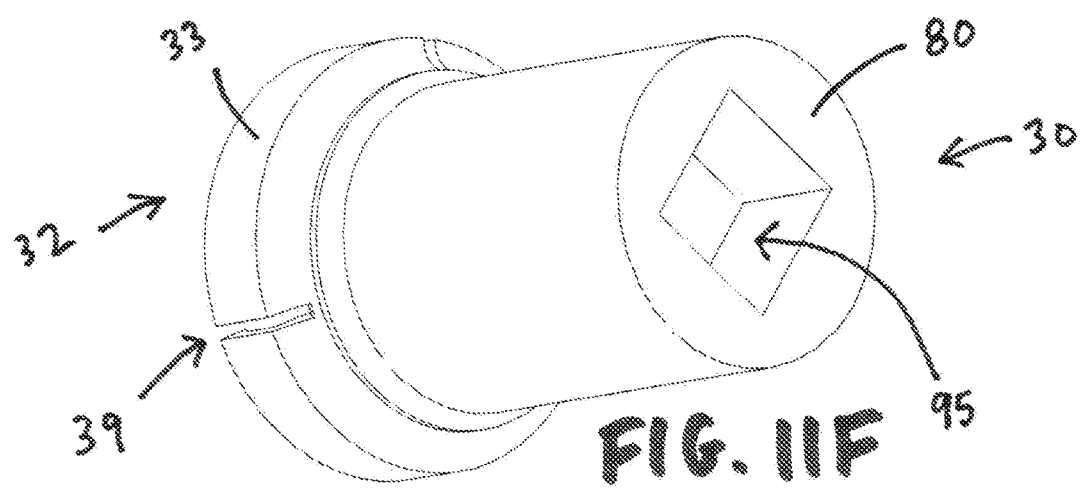

FIG. 11F shows an additional placement member 30 embodiment of the present disclosure, also having a planar end 80 with no aperture 50 defined therethrough, but defining a geometric notch 95 therein, whereby geometric notch 95 does not extend all the way through planar end 80. Such an embodiment may be referred to as a "socket style" embodiment, whereby a tool having a square or other corresponding geometric drive can be used in connection with placement member 30.

Figure 11G:
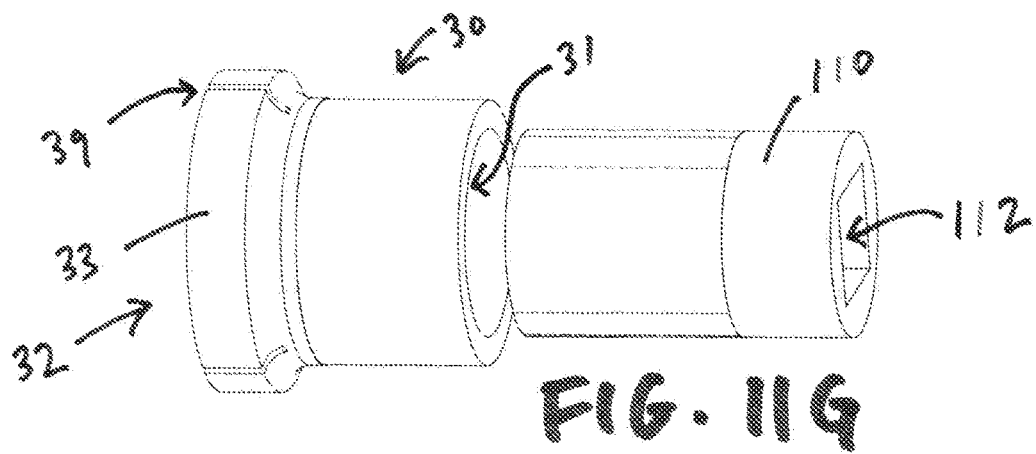
FIG. 11G shows a staging member configured to receive at least part of a socket, according to various embodiments described herein.
Figure 11H:
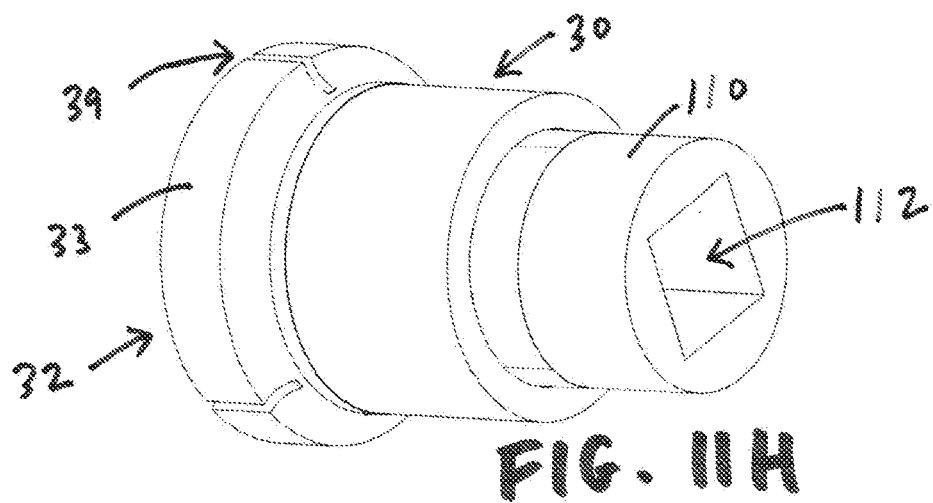
FIG. 11H shows a staging member receiving at least part of a socket, according to various embodiments described herein.

FIGS. 11G and 11H show an additional embodiment of a placement member 30 of the present disclosure configured for use with an existing socket 110. In lieu of using angled interior sides 35, such as a twelve-point configuration shown in FIG. 11B, placement member 30 is configured to at least partially fit around existing socket 110 having a drive aperture 112 defined therein, such as shown in FIG. 11H, so that when staged fasteners 43 pull placement member 30 onto a mating surface (fastener seat 20 of staging member 11, such as shown in FIG. 8), contact with the mating surface (fastener seat 20) will disengage placement member 30 from fasteners 43, allowing placement member 30 to slide up socket 110 while torqueing fastener(s) 43. Placement member 30, for example, can then be repositioned by hand to perform another staging operation, allowing for starting and finishing torque. Existing socket 110, depending on configuration, may need to be shimmed and/or otherwise altered so to, for example, keep a nut 42 flush with a relative end of socket 110.

Figure 12A:
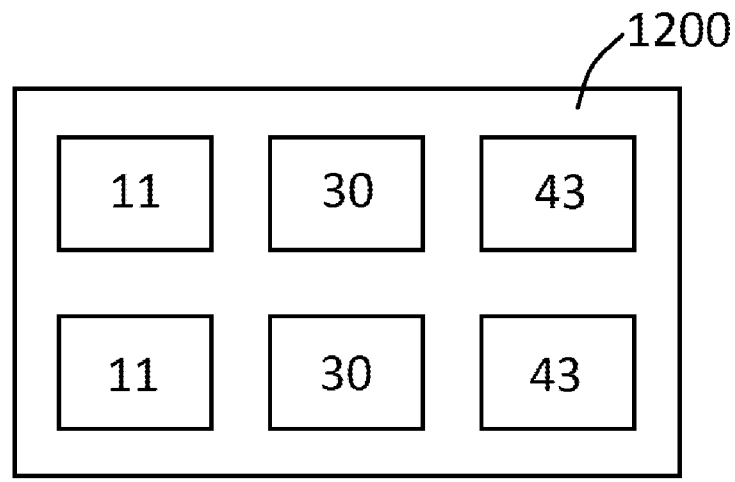
FIGS. 12A and 12B show block component diagrams of kits according to various embodiments described herein.
Figure 12B:
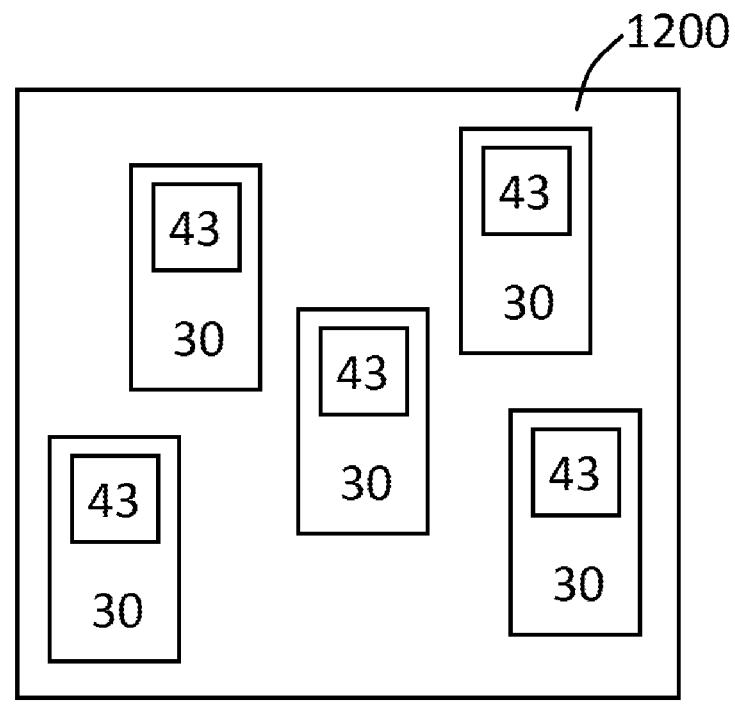

The present disclosure also includes disclosure of various kits 1200, as shown in component block diagrams shown in FIGS. 12A and 12B. In at least one embodiment of a kit 1200 of the present disclosure, and as shown in FIG. 12A, kit 1200 comprises at least one staging member 11 and at least one placement member 30. Additional elements, such as fasteners 43, sockets 100, etc., can be part of various kits 1200 of the present disclosure. FIG. 12B shows another exemplary kit 1200, comprising a plurality of placement members 30 having a plurality of fasteners 43 therein. Such a kit 1200 may include placement members 30 that are relatively thin, such as manufactured using blow molding or vacuum molding, and may "tear away," such as by having perforations 60 defined within placement member, so that a user of kit 1200 could apply a placement member 30 having fasteners 43 therein onto a bolt (for example), and tear away placement member 30 after initial positioning/torqueing. In such an embodiment, kit 1200 may comprise several "disposable" placement members 43, pre-filled with various fasteners 43 therein. Various kits 1200 of the present disclosure can have any number of components/items of the present disclosure included therein.

In various embodiments, components discussed herein of the staging member 11 and/or placement member 30 may be constructed of one or more types of molded plastic or other non-electrically conductive materials typically used in the manufacture of hand tools used by linemen who may be working on electrical wiring. In other alternative embodiments, the components may be made of wood, plastic, fiberglass, carbon fiber, aluminum, metal alloys, or a combination of materials common in the art of fastener tools and hardware. The components may be attached to each other by being integrally formed together, heat bonded, adhesively bonded, or through any other suitable attachment technique.

While various embodiments of tool trays and systems and methods to use the same have been described in considerable detail herein, the embodiments are merely offered as non-limiting examples. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A system, comprising: a staging member, comprising: a dowel sized and shaped to receive a plurality of fasteners, and an attachment portion configured to engage an external product; and a placement member comprising a) a planar distal end having an aperture defined therethrough, the aperture sized and shaped to receive a socket therethrough, the socket having a drive aperture defined within an end of the socket, and b) a fastener gripping portion configured to secure at least one of the plurality of fasteners within a central channel defined within the placement member, wherein the fastener gripping portion comprises a plurality of arms configured to surround at least part of the staging member; wherein the aperture is sized and shaped to receive a socket therethrough, the socket having a drive aperture defined within an end of the socket.

2. The system of claim 1, wherein the aperture is a pilot hole at least partially surrounded by a pilot notch, whereby the pilot notch has a larger diameter than a diameter of the pilot hole.

3. The system of claim 1, configured so that when the socket is positioned into the aperture and into the central channel of the placement member upon the plurality of fasteners, the socket can be used to tighten the plurality of fasteners upon a substrate.

4. The system of claim 3, configured so that the placement member can disengage from the plurality of fasteners and slide toward the drive aperture of the socket.

5. A placement member, comprising a) a planar distal end having an aperture defined therethrough, the aperture sized and shaped to receive a socket therethrough, the socket having a drive aperture defined within an end of the socket, and b) a fastener gripping portion configured to secure at least one of a plurality of fasteners within a central channel defined within the placement member, wherein the fastener gripping portion comprises a plurality of arms configured to surround at least part of a staging member having the plurality of fasteners positioned thereon.

6. The placement member of claim 5, wherein the aperture is a pilot hole at least partially surrounded by a pilot notch, whereby the pilot notch has a larger diameter than a diameter of the pilot hole.

7. The placement member of claim 5, configured so that when the socket is positioned into the aperture and into the central channel of the placement member upon the plurality of fasteners, the socket can be used to tighten the plurality of fasteners upon a substrate and so that the placement member can disengage from the plurality of fasteners and slide toward the drive aperture of the socket.

8. A method, comprising the steps of: positioning a plurality of fasteners upon a dowel of a staging member, the staging member further comprising an attachment portion configured to engage an external product; and positioning a placement member having a fastener gripping portion upon the staging member to secure at least one of the plurality of fasteners within a central channel defined within the placement member, wherein the fastener gripping portion comprises a plurality of arms configured to surround at least part of the staging member having the plurality of fasteners positioned thereon.

9. The method of claim 8, further comprising the step of:
removing the placement member from the staging member, wherein the plurality of fasteners remains secured within the placement member.

10. The method of claim 9, further comprising the step of:
positioning the placement member upon a threaded portion of a bolt;
inserting a socket into an aperture defined within the placement member so that at least a portion of the socket enters the central channel and engages at least one of the plurality of fasteners;
rotating the socket so to position at least one of the plurality of fasteners upon the threaded portion of the bolt; and
removing the placement member from the bolt, wherein the plurality of fasteners are no longer positioned within the placement member.

11. The system of claim 1, wherein two adjacent arms of the plurality of arms are separated by a cutout recess.

12. The system of claim 1, wherein the aperture is circular.

13. The system of claim 1, wherein the plurality of arms are configured to flex outward.

14. The system of claim 1, forming part of a kit, the kit further comprising at least one fastener.

15. The system of claim 1, forming part of a kit, the kit further comprising at least one additional placement member.

16. The placement member of claim 5, wherein two adjacent arms of the plurality of arms are separated by a cutout recess.

17. The placement member of claim 5, wherein the aperture is circular.

18. The placement member of claim 5, wherein the plurality of arms are configured to flex outward.

19. The placement member of claim 5, forming part of a kit, the kit further comprising at least one staging member and at least one fastener.

20. The placement member of claim 5, forming part of a kit, the kit further comprising at least one staging member and at least one additional placement member.

* * * * *